(12) United States Patent
Evenson

(10) Patent No.: US 6,722,046 B2
(45) Date of Patent: Apr. 20, 2004

(54) PORTABLE FORWARD CUTTING POWER SAW

(76) Inventor: Ben L Evenson, 831 Eastland St., Elmhurst, IL (US) 60126

( * ) Notice: Subject to any disclaimer, the term of this patent is extended or adjusted under 35 U.S.C. 154(b) by 143 days.

(21) Appl. No.: 09/945,959

(22) Filed: Sep. 4, 2001

(65) Prior Publication Data

US 2003/0041717 A1 Mar. 6, 2003

(51) Int. Cl.⁷ .............................................. B23D 45/16
(52) U.S. Cl. ...................................................... 30/391
(58) Field of Search ................ 30/391, 390; 125/13.01

(56) References Cited

U.S. PATENT DOCUMENTS

| | | |
|---|---|---|
| 1,816,966 A | 8/1931 | Gray et al. |
| 1,942,766 A | 1/1934 | O'Banion |
| 2,139,272 A | 12/1938 | Jaworski |
| 2,274,421 A * | 2/1942 | Lindstrom et al. ............ 30/390 |
| 2,342,052 A | 2/1944 | Jimerson et al. |
| 3,449,992 A | 6/1969 | Hanaway |
| 3,616,488 A | 11/1971 | Barefield |
| 3,805,639 A * | 4/1974 | Peter ........................ 30/391 X |
| 4,081,906 A | 4/1978 | Sigler |
| 4,249,313 A | 2/1981 | Bates |
| 5,012,582 A | 5/1991 | Bristol et al. |
| 5,142,825 A | 9/1992 | Floyd |

FOREIGN PATENT DOCUMENTS

| | | |
|---|---|---|
| CA | 1161797 | 2/1984 |
| CA | 1255307 | 8/1987 |

* cited by examiner

Primary Examiner—Douglas D. Watts
(74) Attorney, Agent, or Firm—Michael I Kroll

(57) ABSTRACT

A hand held rotary blade saw with a motor, rotary saw blade, driving connection between the motor and the blade, two pivotable forward blade guards with top and bottom hand manipulable pivot members for exposing either a left or right blade sector for cutting, or an upward or downward blade sector when the blade is vertically oriented by twisting the wrist. The switch is operable by the thumb or the finger, such that left and right handed users have operational parity regardless of blade orientation, which hand is holding the saw, or whether the thumb or finger is operating the switch. Parallel receding blade guard edges form a forward notch enabling forward cutting. The blade is interchangeable and a carrying case, belt holster attachment, and special battery charger are provided. The battery charger charges the battery while the battery is in the saw or when it is removed.

40 Claims, 13 Drawing Sheets

PORTABLE FORWARD CUTTING POWER SAW

BACKGROUND OF THE INVENTION

1. Field of the Invention

The present invention relates generally to power saws, and more specifically, to a forward-cutting power saw having a drive gear assembly that turns a geared blade attachment plate and an adjacent cutting blade of a greater diameter.

2. Description of the Prior Art

There are other portable devices designed for cutting. Typical of these is U.S. Pat. No. 1,816,966 issued to Albert S. Gray on Aug. 4, 1931.

Another patent was issued to John W. O'Banion on Jan. 9, 1934 as U.S. Pat. No. 1,942,766. Yet another U.S. Pat. No. 2,139,272 was issued to Charles N. Jaworski on Dec. 6, 1938 and still yet another was issued to Francis A. Jimerson et al. on Feb. 15, 1944 as U.S. Pat. No. 2,342,052.

Another patent was issued to Charles D. Hanaway on Jun. 17, 1969 as U.S. Pat. No. 3,449,992. Yet another U.S. Pat. No. 3,616,488 was issued to William A. Barefield on Nov. 2, 1971. Another was issued to Thelma G. Sigler on Apr. 4, 1978 as U.S. Pat. No. 4,081,906 and still yet another was issued on Feb. 10, 1981 to Richard G. H. Bates as U.S. Pat. No. 4,249,313.

Another patent was issued to George A. Boyum et al. on Feb. 7, 1984 as Canadian Patent No. 1,161,797. Yet another Canadian Patent No. 1,225,307 was issued to Douglas R. Mongeon on Aug. 11, 1987. U.S. Pat. No. 5,012,582 was issued to Steven L. Bristol et al. on May 7, 1991 and another patent was issued to Kenneth R. Floyd on Sep. 1, 1992.

U.S. Pat. No. 1,816,966

Inventor: Albert S. Gray

Issued: Aug. 4, 1931

A pruning device comprising a hollow pole, a shaft extending longitudinally of and rotatably supported within the pole, an electric motor secured to the lower end of the pole with it's armature shaft secured to said first shaft, a sleeve on the upper end of the pole and extending above the same, an arm extending longitudinally of one side of the sleeve and provided at its upper end with a bearing boss extending across the upper end of the sleeve, means removably securing the sleeve and arm to the pole, an arbor journaled in the bearing boss, a circular saw secured to the arbor, a stub shaft journaled in the sleeve and detachably connected to said first shaft, meshing gears fixed to the arbor and the stub shaft, an arm extending upwardly from the upper end of said first arm in the direction of the opposite side of the sleeve and to a point beyond the saw, and a shield for the saw removably secured to the upper end of said second arm and to the sleeve.

U.S. Pat. No. 1,942,766

Inventor: John W. O'Banion

Issued: Jan. 9, 1934

A cutting device for a plaster cast comprising a guide adapted for introduction underneath the cast, a rotary cutter mounted for cutting into the plaster as the guide advances, a pistol grip mounted in supporting relation to the guide and the cutter, and having a motor thereon, a driving connection between the motor and the cutter, a guard for the latter and a slide mounted near the pistol grip and operatively connected to the guard for retracting and advancing the same.

U.S. Pat. No. 2,139,272

Inventor: Charles N. Jaworski

Issued: Dec. 6, 1938

A saw for removing plaster casts, said saw including a support, a pair of saws spaced apart and rotatably mounted in said support, a shoe projecting from said support along the peripheries of said saws, a presser lever extending from said support between the saws along the peripheries thereof to clear the space between them and adapted to be positioned with its end below the upper surface of said shoe, and means for rotating said saws.

U.S. Pat. No. 2,342,052

Inventor: Francis A. Jimerson et al.

Issued: Feb 15, 1944

A portable cutting tool, comprising a casing, a rotary toothed cutting disc in the casing, there being a recess in the casing to expose a segment of the cutting disc, a motor for driving the cutting disc, a grip portion on the casing extending laterally of the axis of rotation of the cutting disc and connected to an end of the motor, a grip portion on the other end of the motor, means in one grip portion and the casing for transmitting movement from the motor to the cutting disc, a guard for the cutting disc swingable into the casing and into the plane of the recess, a spring constantly tending to move the guard into the plane of the recess, a transmission member connected to the guard, and a lever on the casing adjacent said grip portion and connected to the transmission member for moving the guard out of the plane of the recess into the casing.

U.S. Pat. No. 3,449,992

Inventor: Charles D. Hanaway

Issued: Jun. 17, 1969

A pipe or bar cutting machine of compact construction having a main frame and a secondary frame with gripping surfaces on both frames and the secondary frame guided and movable on the main frame by a screw adjustment for clamping a work piece. An electric motor with a convenient grip and trigger slidably mounted in the main frame and driving a rotary cutter also slidably mounted in a frame to move the cutter through a work piece clamped between the gripping surfaces of the frames. The frames are conveniently portable by reason of their attachment to the motor and the convenient hand grip on the motor.

U.S. Pat. No. 3,616,488

Inventor: William A. Barefield

Issued: Nov. 2, 1971

A cutting tool for opening the body cavity of chickens to allow easy evisceration and inspection. The tool has a power driven, circular cutting blade which is power driven from a motor contained within a housing that is held in the hand. A guide means extends below the edge of the cutting blade and beneath the tool housing and hand and is inserted into the chicken carcass. There is a blade shield around the front of the blade whereby the only entrance to the blade is between the housing and the insertion member.

U.S. Pat. No. 4,081,906

Inventor: Thelma G. Sigler

Issued: Apr. 4, 1978

A hand held electrically driven cutter assembly for removing casts from the body of a patient includes a vertically articulatable bottom plate insertable between the cast and the body surface which on the interior of the cutter assembly forms a switch in series with a trigger switch connected to the main power. Two circular cutters, inclined relative each other, are disposed above and ahead of the bottom plate to open up a kerf therefor. The power to the cutters is transmitted through a pulley and gear combination to be driven by an electric motor. It is this electric motor that is series connected to the bottom plate switch and power will be applied to the cutters only upon upward urging of the cutter assembly.

U.S. Pat. No. 4,249,313

Inventor: Richard G. H. Bates

Issued: Feb. 10, 1981

A hand held portable pruning tool having a housing enclosing a motor one or more batteries and a saw blade. The saw blade is rotatable about an axis perpendicular to the axis of the housing. The blade is normally protected by a telescoping guard element having a forwardly extending notch for receiving a stem or limb to be cut. The telescoping guard element retracts into the housing in response to pressure exerted on the guard element in the direction of the stem thus bring the stem into contact with the blade and also energizing the motor.

Canadian Patent Number 1,161,797

Inventor: George A. Boyum et al.

Issued: Feb. 7, 1984

A tree-trimming apparatus mounted on a mobile support vehicle. The apparatus includes a telescoping boom pivotally mounted on a pedestal. The pedestal is pivotally mounted to a turntable which is rotatably mounted on the support vehicle. An operator's station is mounted on the pedestal to provide control of the apparatus. A large diameter circular saw is mounted at the end of the boom and is powered by a high speed hydraulic motor to provide high cutting efficiency. A fiberglass boom and electrically non-conductive hoses provide maximum safety for the operator.

Canadian Patent Number 1,225,307

Inventor: Douglas R. Mongeon

Issued: Aug. 11, 1987

An orbital saw for use in orthopedic applications such as cutting bones including a one-piece, externally mounted saw blade that can be quickly and easily replaced by unlocking a pair of blade clamps. The saw can be battery operated. The battery is keyed and locked with a hand grip by a release lever to form a handle. The battery can be unlocked and replaced when it becomes run down.

U.S. Pat. No. 5,012,582

Inventor: Steven L. Bristol et al.

Issued: May 7, 1991

A hand-held, battery-operated rotary blade saw useful for cutting plastic clips or straps which secure a face mask to a football helmet. Several configurations, having differing safety shields, are disclosed. The device is an emergency/rescue tool to quickly remove a face mask from a football helmet allowing access to the face of a football player without removal of the helmet with its concomitant risk of cervical injury.

U.S. Pat. No. 5,142,825

Inventor: Kenneth R. Floyd

Issued: Sep. 1, 1992

An elongated portable frame is provided including front and rear ends and a mid-length laterally outwardly projecting tubular handle for containing a battery pack. The front end of the frame journals a saw blade therefrom and the saw blade is driven by an electric motor supported from the frame. A pair of rearwardly retractable jaws are disposed on opposite sides of the forward periphery of the saw blade and are opposed by a rearwardly retractable jaw structure disposed forwardly of the forward limit positions of movement of the jaw members and an actuator for the jaw structure is disposed immediately forward of the handle for engagement and rearward displacement by the forefinger of a hand encircling the handle, whereby the jaw structure may be shifted rearwardly to initially clamp a work piece to be cut between the jaws and the jaw structure and thereafter utilized to rearwardly advance the work piece to be cut relative to the saw blade. The rear of the frame journals rearwardly facing inner and outer conical grinding stones for outwardly and inwardly beveling, respectively, cut ends of tubular work pieces severed by the saw blade.

While these portable cutting devices may be suitable for the purposes for which they were designed, they would not be as suitable for the purposes of the present invention, as hereinafter described.

For example, only a limited forward cutting capability is described in such devices, with most having no forward cutting capability at all. Furthermore, such devices no not provide a hand held rotary blade saw that can readily present an upwardly, downwardly, rightwardly and leftwardly exposed cutting blade sector, with full functional reciprocity between a right handed and left handed user. Such capabilities are needed to optimize the utility of a hand held saw.

SUMMARY OF THE PRESENT INVENTION

A primary object of the present invention is to provide a cordless, hand-held rotary saw to replace manual hacksaws in many operations.

Another object of the present invention is to provide a hand held rotary blade saw that can readily present an upwardly, downwardly, rightwardly and leftwardly exposed cutting blade sector, with full functional reciprocity between a right handed and left handed user.

An additional object of the present invention is to provide a cordless, hand-held rotary saw having a cutting blade locking mechanism that prevents the blade from spinning and enables the cutting blade to be quickly and easily changed.

A further object of the present invention is to provide a cordless, hand-held rotary saw wherein the rotary cutting blade is placed on a gear-driven plate with a central hub assembly, along with two locking posts that pass through corresponding recesses in said cutting blade.

A yet further object of the present invention is to provide a cordless, hand-held rotary saw wherein movement of the gear-driven plate is transmitted via a drive shaft with a motor at one end and a drive gear communicating with said gear-driven plate.

Another object of the present invention is to provide a cordless, hand-held rotary saw/grinder wherein the power source of the motor is a rechargeable battery.

Still another object of the present invention is to provide a cordless, hand-held rotary saw having spring-loaded retractable blade guards.

One more object of the present invention is to provide a cordless, hand-held rotary saw that is simple and easy to use.

A further object of the present invention is to provide a cordless, hand-held rotary saw that is economical in cost to manufacture.

Another object of the present invention is to provide a hand-held rotary saw/grinder wherein the power source of the motor is an external source.

Further objects of the present invention will appear as the description proceeds.

My device is a hand held rotary blade saw that has a grip that allows the user to use either thumb or finger to operate the switch without losing blade orientation function. A motor drives a rotor shaft that is in geared communication with a blade gear to which a rotary cutting blade is attached. Two blade guards are spring-biased into a position covering the forward cutting surfaces of the blade. Receding forward edges on the guards allow direct contact with an object to be cut to separate the guards and expose the forwardmost cutting sector. For other applications, dual top and bottom side pivot members are readily accessible to allow both left and right handed users to selectively expose a leftward, rightward, upward or downward cutting surface as the need arises.

A hand held rotary blade saw powered by a power source is provided, comprising: a housing, having a front portion and a rear portion; an electric motor contained within the housing rear portion; an electromechanical switch in electronic communication with the motor and power source for activating motor functions; a rotary saw blade mounted in the housing front portion, the rotary saw blade having a rear sector circumference enclosed within the housing front portion, a first front sector circumference, and a second front sector circumference, the combined rear, first front and second front circumferences summing to a circle; a driving connection between the motor and the rotary saw blade for rotating the rotary saw blade; a first blade guard, the first blade guard being pivotable about the rotary blade from a first position covering substantially all of the blade first front sector circumference, to a second position, such that the first front sector circumference is partially exposed; a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted; and at least one guard spring contained in the housing front portion, the at least one guard spring biasing the first blade guard into the first position, and the second blade guard into the first position.

In another embodiment, the first blade guard further comprises at least one pivot member for manual manipulation such that the first blade guard is pivoted about the rotary blade.

In another embodiment, the first blade guard has a first and second side each side having at least one of the at least one pivot members.

In another embodiment, at least one of the at least one pivot members protrudes from the first blade guard.

In another embodiment, at least one of the at least one pivot members recedes into the first blade guard.

In another embodiment, the first blade guard has an edge proximate the blade circumference and at least one of the at least one pivot members is positioned on the edge.

In another embodiment, the first blade guard has a first side, a second side, and an edge proximate the blade circumference, and at least one of the at least one pivot members extends continuously from the first side, around the edge and to the second side.

In another embodiment, the second blade guard further comprises at least one pivot member for manual manipulation such that the second blade guard is pivoted about the rotary blade.

In another embodiment, the second blade guard has a first and second side each side having at least one of the at least one pivot members.

In another embodiment, at least one of the at least one pivot members protrudes from the second blade guard.

In another embodiment, at least one of the at least one pivot members recedes into the second blade guard.

In another embodiment, the second blade guard has an edge proximate the blade circumference and at least one of the at least one pivot members is positioned on the edge.

In another embodiment, the second blade guard has a first side, a second side, and an edge proximate the blade circumference, and at least one of the at least one pivot members extends continuously from the first side, around the edge and to the second side.

In another embodiment, the first blade guard further comprises at least one pivot member for manual manipulation such that the first blade guard is pivoted about the rotary blade, and the second blade guard further comprises at least one pivot member for manual manipulation such that the second blade guard is pivoted about the rotary blade.

In another embodiment, the first blade guard has a first and second side each side having at least one of the at least one first blade guard pivot members, and the second blade guard has a first and second side each side having at least one of the at least one second blade guard pivot members.

In another embodiment, at least one of the at least one first blade guard pivot members protrudes from the first blade guard, and at least one of the at least one second blade guard pivot members protrudes from the second blade guard.

In another embodiment, at least one of the at least one first blade guard pivot members recedes into the first blade guard, and at least one of the at least one second blade guard pivot members recedes into the second blade guard.

In another embodiment, the first blade guard has an edge proximate the blade circumference and at least one of the at least one first blade guard pivot members is positioned on the first blade guard edge, and the second blade guard has an edge proximate the blade circumference and at least one of the at least one second blade guard pivot members is positioned on the second blade guard edge.

In another embodiment, the first blade guard has a first side, a second side, and an edge proximate the blade circumference, and at least one of the at least one first blade guard pivot members extends continuously from the first blade guard first side, around the edge and to the second side, and the second blade guard has a first side, a second side, and an edge proximate the blade circumference, and at least one of the at least one second blade guard pivot members extends continuously from the second blade guard first side, around the edge and to the second side.

In another embodiment, the power source is a battery.

In another embodiment, the battery is contained in the housing rear portion, the battery being in electronic communication with the motor.

In another embodiment, the housing rear portion is adapted to receive a power cord for delivering power to the motor.

In another embodiment, the at least one blade guard spring comprises a first blade guard spring biasing the first blade guard and a second blade guard spring biasing the second blade guard.

In another embodiment, the driving connection further comprises: a post positioned within the housing front portion; a blade gear, the blade gear being attached to the rotary blade and mounted on the post for rotation; and a rotor shaft extending out of the motor and into the housing front portion, the rotor shaft being in geared communication with the blade gear such that the blade gear is rotated as the rotor shaft is rotated.

In another embodiment, the blade gear has at least two locking posts, the rotary blade having at least two apertures for closely receiving the locking posts, thus preventing slip as the rotary blade rotates with the blade gear on the post.

In another embodiment, the housing front portion has a removable portion, allowing removal of the blade from the post.

In another embodiment, the device further comprises a hub assembly having a first and second portion, the blade and the blade gear each having a centrally disposed hole for closely receiving the hub assembly first portion, the blade being attached to the blade gear by the joinder of the hub assembly second portion to the first portion so received.

In another embodiment, the blade gear has at least one protrusion and the blade has at least one hole aligned with said protrusion when the blade is attached to the blade gear.

In another embodiment, the first and second blade guards each have a forward edge, the forward edges being substantially aligned and proximate when the first and second blade guards are both in the first position, the first and second blade guard forward edges each having a receding edge such that the forward edge receding edges form a notch.

In another embodiment, the switch has a member positioned for being pressed by the thumb while the housing rear portion is being hand held.

In another embodiment, the member must be pressed down and then forward to activate the motor.

In another embodiment, the device further comprises a carrying case, the case being sized to receive the saw, the case having a zippered lid, at least one belt loop, a hinged flap, the flap having a threaded protrusion for receiving additional blades, and a nut for coupling with the threaded protrusion on the flap.

In another embodiment, the device further comprises a saw carrying device for carrying the saw on a belt, the device having a holster, a belt clasp for attaching the holster to the belt, and a hook and loop fastener having a first portion on the holster and a second portion on the saw.

In another embodiment, the device further comprises a charger, the power source being a battery contained within the housing rear portion, the charger having a first receptacle, the saw housing rear portion being adapted to be received by the first charger receptacle such that the battery is charged while remaining in housing rear portion, the charger having a second receptacle for receiving the battery, the battery being charged when so received.

In another embodiment, the charger is powered by both an AC power cord and an automobile charger plug cord.

In another embodiment, the power source is an external battery, the housing rear portion being adapted to electronically mate with the external battery.

In another embodiment, the device further comprises an AC power cord, the housing rear portion being electronically mated with the cord such that the motor is powered when the cord is plugged into an AC receptacle.

A hand held rotary blade saw is provided, comprising: a housing, having a front portion and a rear portion; a rotary saw blade mounted in the housing rear portion on the post, the rotary saw blade having a rear sector circumference enclosed within the housing front portion, a first front sector circumference, and a second front sector circumference, the combined rear, first front and second front circumferences summing to a circle; means for electro-mechanically rotating the rotary saw blade; means for alternately covering and partially exposing the blade first front sector circumference, said means being biased to the covering position; and means for alternately covering and partially exposing the blade second front sector circumference, said means being biased to the covering position.

In another embodiment, the means for alternately covering and partially exposing the blade first front sector further comprises means for manually manipulating said means from both above and below the bottom side of the saw.

In another embodiment, the means for alternately covering and partially exposing the blade second front sector further comprises means for manually manipulating said means from both above and below the bottom side of the saw.

In another embodiment, the means for electro-mechanically rotating the rotary saw blade has a motor, a power source for powering the motor, an electromechanical switch for activating the motor functions, a rotor shaft rotated by the motor, a drive gear rotated by the rotor shaft, and a blade gear rotated by the drive gear and attached to the rotary blade.

In another embodiment, the power source is a battery.

In another embodiment, the device further comprises means for charging the battery.

In another embodiment, the means for charging the battery further comprises means for charging the battery while the battery remains in the housing rear portion.

In another embodiment, the device further comprises means for enclosing and transporting the saw.

In another embodiment, the device further comprises means for holstering and transporting the saw.

A hand held rotary blade saw is provided, comprising: a housing, having a front portion and a rear portion; an electric motor contained within the housing rear portion; a power source for powering the motor; an electromechanical switch in electronic communication with the motor and power source for activating motor functions; a rotary saw blade mounted in the housing front portion, the rotary saw blade having a rear sector circumference enclosed within the housing front portion, a first front sector circumference, and a second front sector circumference, the combined rear, first front and second front circumferences summing to a circle; a driving connection between the motor and the rotary saw blade for rotating the rotary saw blade; a first blade guard, the first blade guard being pivotable about the rotary blade from a first position covering substantially all of the blade first front sector circumference, to a second position, such that the first front sector circumference is partially exposed; a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted; and at least one guard spring contained in the housing front portion, the at least one guard spring biasing the first blade guard into the first position, and the second blade guard into the first position.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 1 is a perspective view of the present invention in use showing a man using the battery operated hand-held rechargeable saw and grinder for cutting material such as pipes, metal tubing, wires, etc. The present invention replaces the manual hacksaw in many operations. It also has replaceable saw and grinder blades in a plurality of sizes.

DESCRIPTION OF THE REFERENCED NUMERALS

Figure 1:
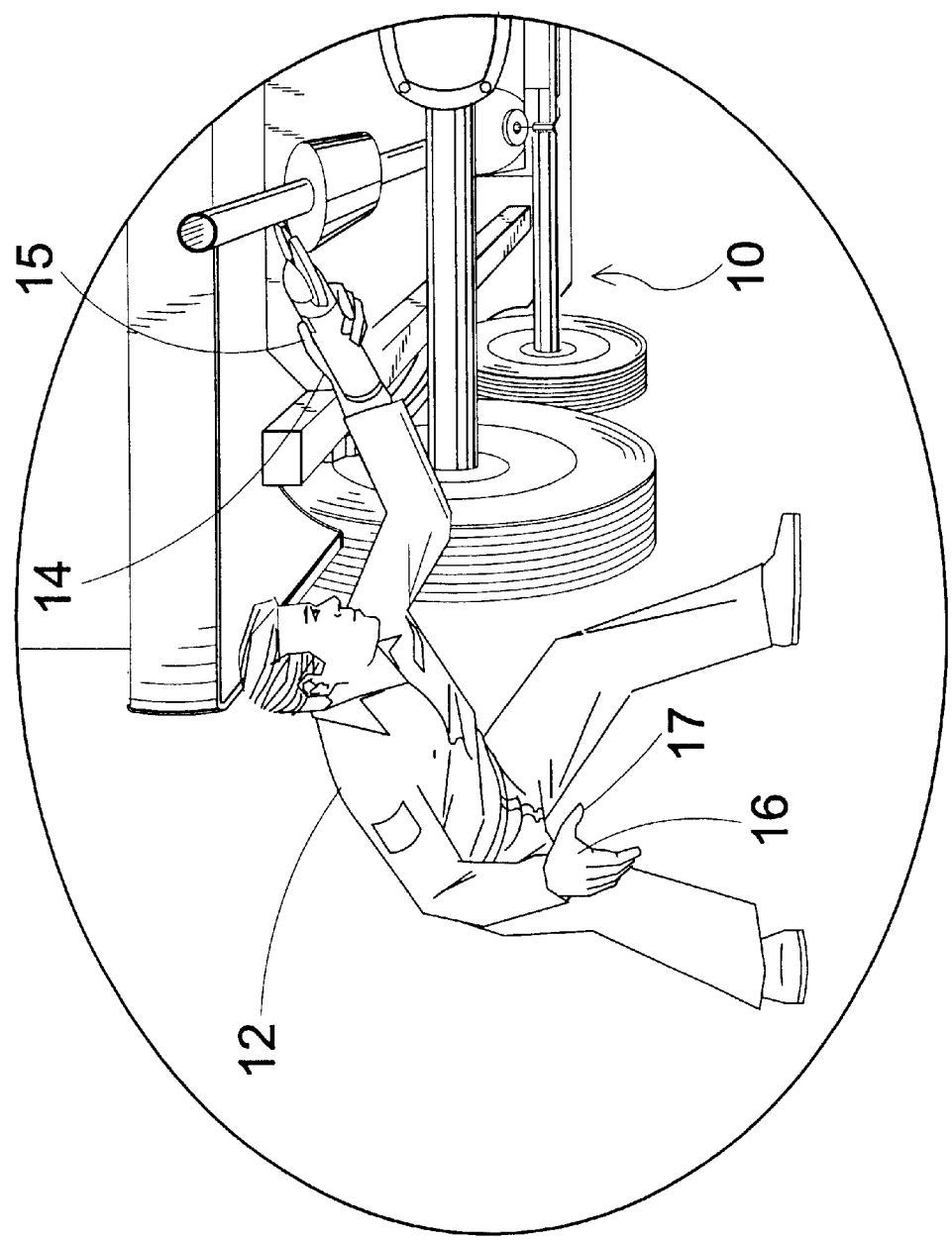
Figure 2:
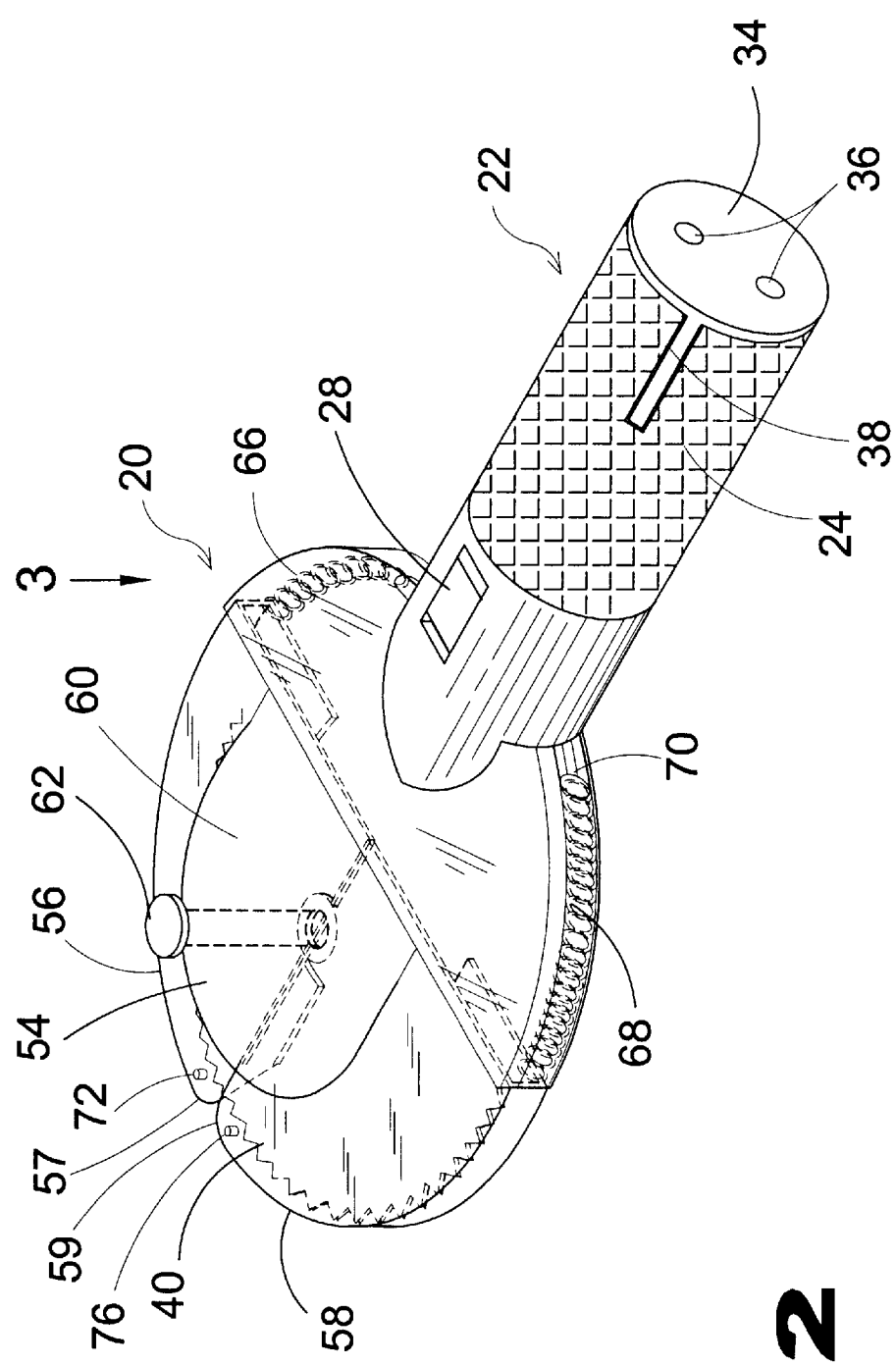
FIG. 2 is a perspective view of the present invention. The fronts of the dual blade guards of the present invention help guide the tool then retract away from the material being cut.

Turning now descriptively to the drawings, in which similar reference characters denote similar elements throughout the several views, the figures illustrate the Portable Forward Cutting Power Saw of the present invention. With regard to the reference numerals used, the following numbering is used throughout the various drawing figures.

10 Portable Forward Cutting Power Saw of the present invention
12 user
14 left hand
15 left thumb
16 right hand
17 right thumb
18 pipe
20 front housing
22 rear housing
24 grip
25 switch button
26 switch
27 switch button spring
28 motor
30 battery
32 wiring
34 end cap
36 end cap apertures
38 key guide
40 rotary blade
42 rotor shaft
44 drive gear
46 blade gear
48 hub assembly
50 blade gear locking posts
52 blade apertures 54 locking bolt
56 first blade guard
57 first blade guard receding edge
58 second blade guard
59 second blade guard receding edge
60 front housing top member
62 captive nut
64 new blade
66 first blade guard spring
68 second blade guard spring
70 spring member
72 first blade guard first pivot member
74 first blade guard second pivot member
76 second blade guard first pivot member
78 second blade guard second pivot member
100 first blade guard edge pivot member
102 second blade guard edge pivot member
110 carrying case
112 case compartment
114 case compartment lid
116 case compartment lid zipper
118 belt loops
120 flap
122 hook and loop flap fasteners
124 securing nut
130 tool belt attachment
132 holster
134 belt clasp
136 hook and loop fastener
140 battery charger
142 charger receptacle for device handle
144 key
146 charger receptacle for battery
148 AC power cord
150 auto charger plug cord
152 function switch
154 function status indicator lights

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The device 10 is shown generally in FIGS. 1–9, while FIGS. 10–13 depict special accessories. FIG. 1 shows the device 10 in use by the user 12, who holds the device 10 in his left hand 14 with his left thumb 15 on the top of the device 10. The user's right hand 16 and right thumb 17 are also depicted, the right hand 16 being freed for other purposes due to the compact configuration of the device 10. The device 10 is being used to cut a hard to access tailpipe under an automobile.

The device 10 has a front housing 20 and a rear housing 22, with the rear housing being fitted with a rubber grip 24 and being sized and configured such that a normal grip places the thumb 15 proximate the switch 26. In most cases, for safety reasons, users 12 prefer to operate hand held power tools with switches, triggers and the like in immediate proximity to the thumb or finger that operates the switch. The present device 10 allows full operation using the thumb or finger of either hand.

Figure 4:
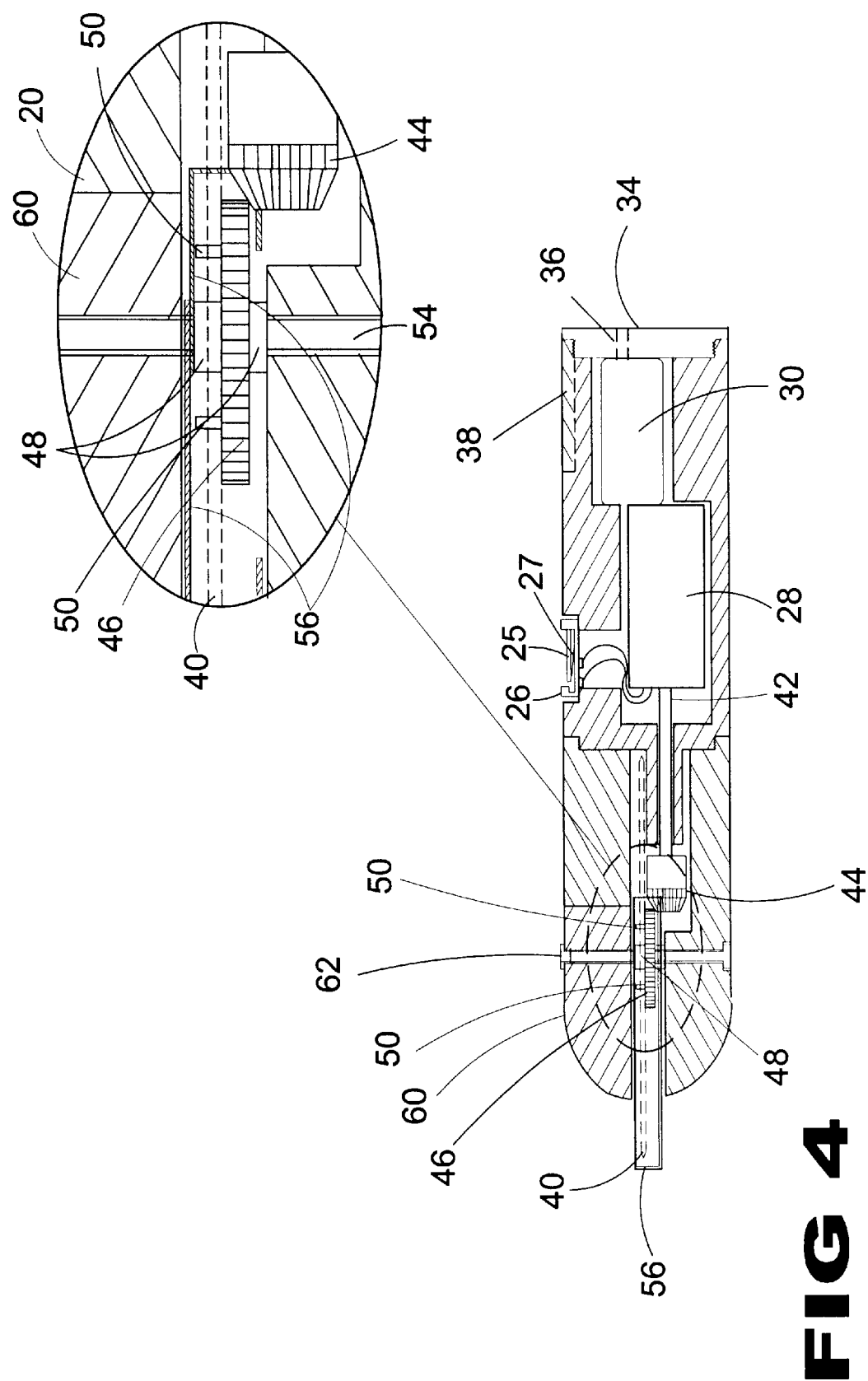
FIG. 4 is a side sectional view of the present invention.

As shown in FIG. 4, a motor 28 and a battery 30 are contained within the housing rear portion 22, with wiring 32 (representatively shown) as needed to establish the on-off function of the switch 26 with respect to motor 28 activation, using battery 30 power and circuitry commonly employed for that purpose. A removable end cap 34 secures the battery 30 within the rear housing 22, and has one or more apertures 36 to allow passage of battery charger cords and the like. A key guide 38 is provided for proper alignment of the housing rear portion 22 in the battery charger 140 receptacle 142.

Figure 3:
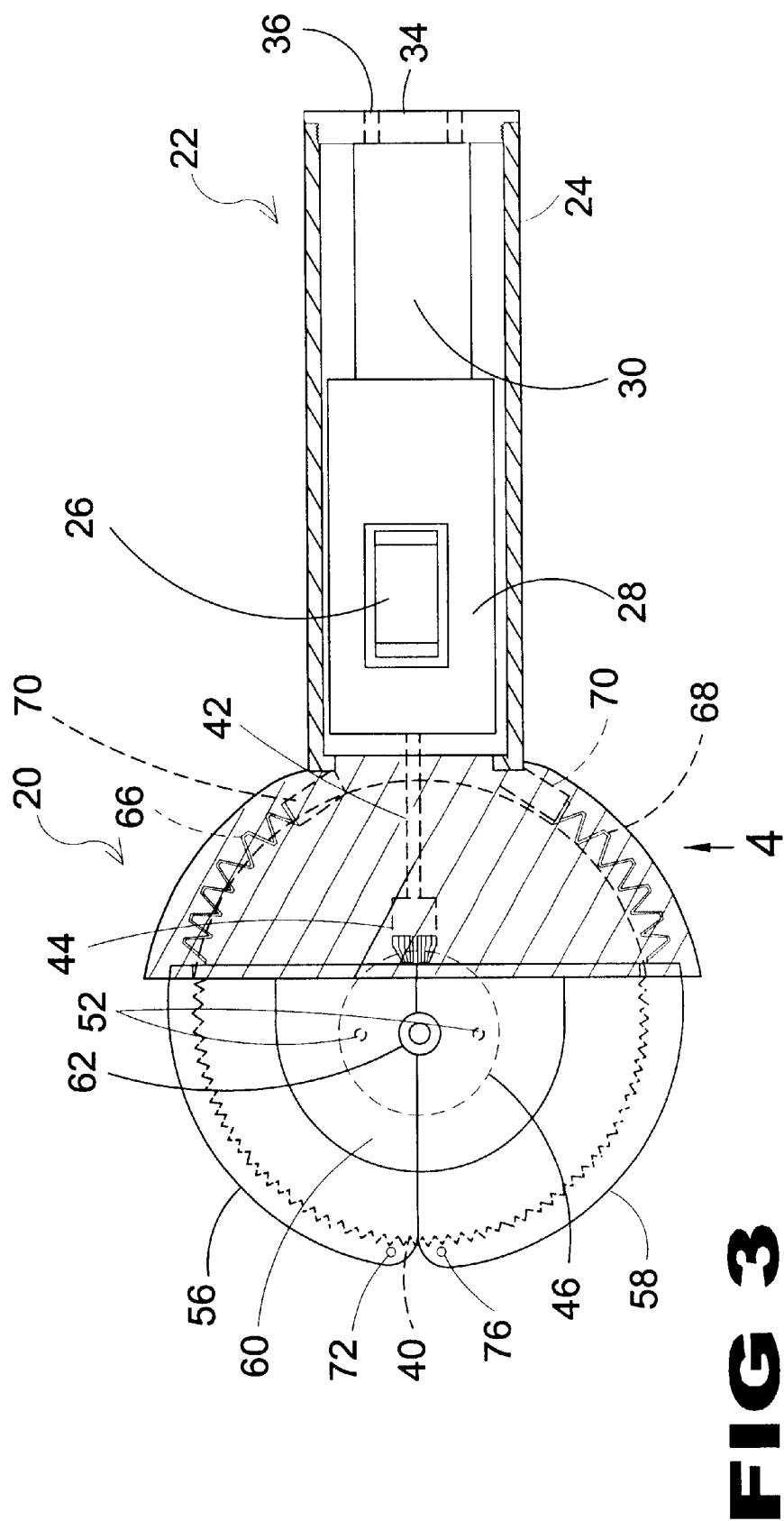
FIG. 3 is a top view of the present invention. The locking bolt of the present invention holds the blade guards, blade gear and rotary saw blade in place within the front housing and makes for easy changing of cutting blades.
Figure 5:
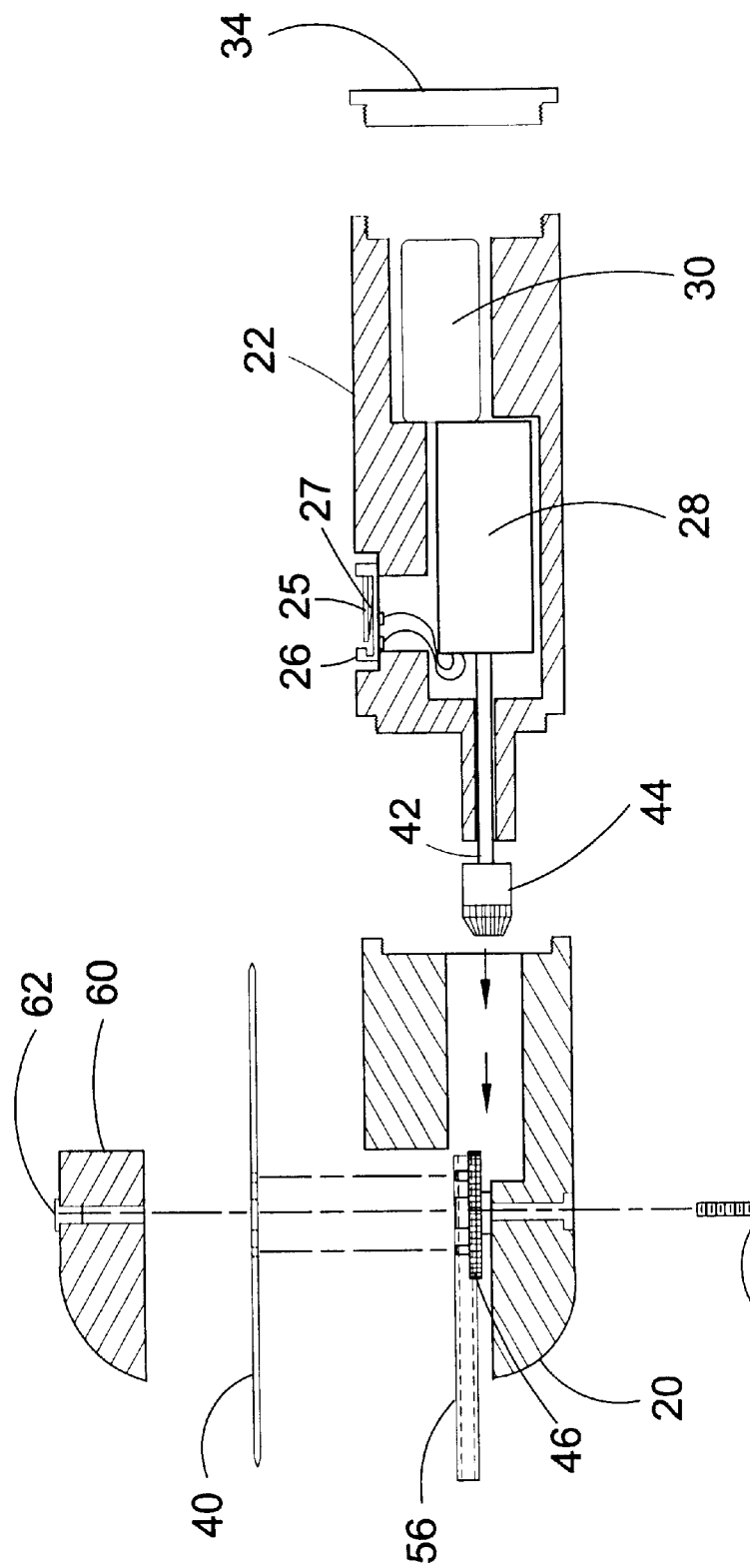
FIG. 5 is an exploded cross-sectional side view of the present invention.
Figure 6:
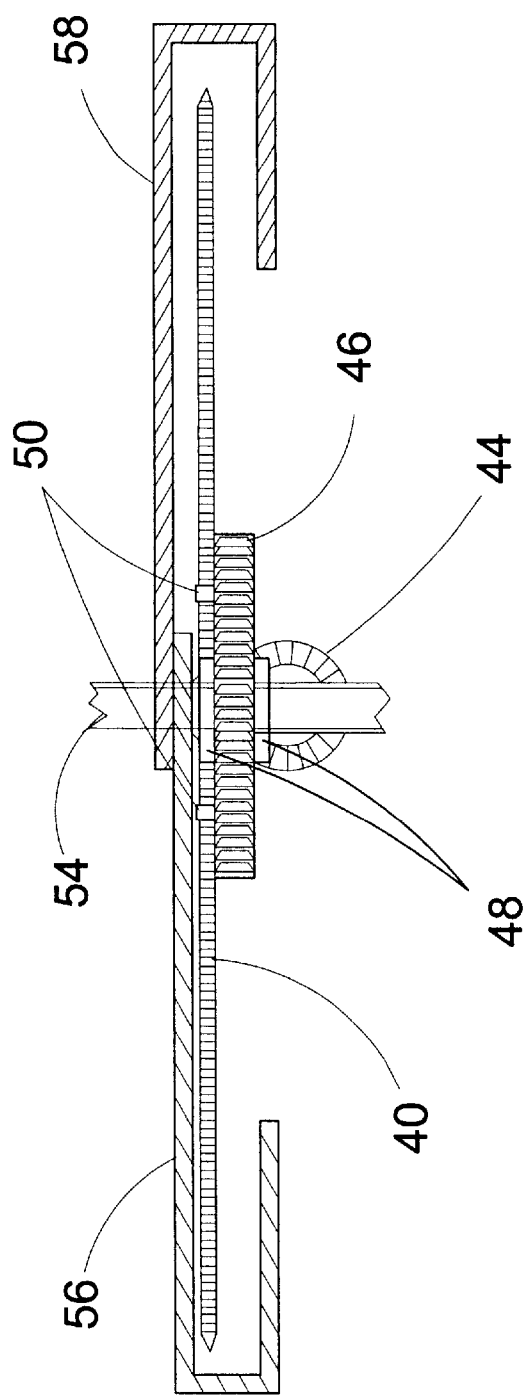
FIG. 6 is a partial frontal view with the blade guards sectioned.
Figure 7:
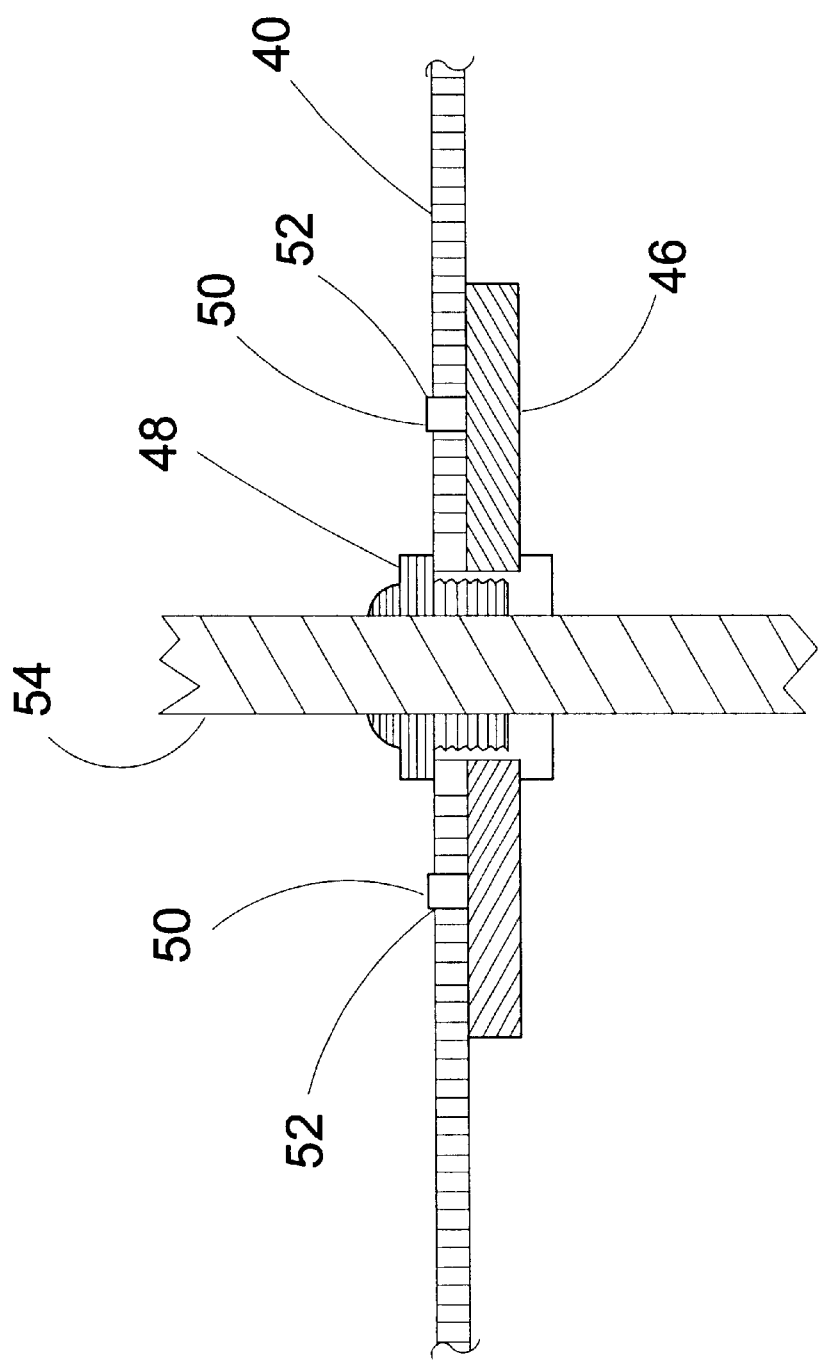
FIG. 7 is a partial sectional view showing the hub assembly, blade gear, locking bolt, locking posts, and rotary blade.

As shown in FIG. 3, the front housing 20 expands as necessary to encompass approximately one-half of the area of a rotary blade 40. Extending from the motor 28 and into the front housing 20 is a rotor shaft 42 that terminates with a beveled drive gear 44. The drive gear 44 mates with a horizontally positioned blade gear 46 to which the blade 40 is attached as shown in FIGS. 5–7. A hub assembly 48 draws the blade 40 tightly against the blade gear 46 after blade gear locking posts 50 are aligned with, and inserted into, blade holes 52. The inserted locking posts 50 prevent slippage of the blade 40 with respect to the blade gear 44.

The hub assembly 48 is positioned for rotation about the shaft of a locking bolt 54. The locking bolt 54 is inserted through the front housing 20, through the hub assembly 48, through a first blade guard 56, a second blade guard 58, a front housing top member 60, and then coupled with a captive nut 62 near the top of the front housing top member 60.

New blades 64 can be substituted for the blade 40 by removing the locking bolt 54 and the front housing top member 60, thus allowing the blade 40, blade gear 46 and hub assembly 48 to be withdrawn from the front housing 20. A new blade 64 is then attached to the blade gear 46 using the hub assembly 48. The new blade 64 is then inserted into the front housing 20 and the front housing top member 60 is positioned for reinsertion of the locking bolt 54.

The blade guards 56, 58 pivot about the locking bolt 54. The first blade guard 56 is sized such that it is received into the second blade guard 58 as needed to allow the pivoting motion of either blade guard 56, 58 to proceed. As either blade guard 56, 58 pivots it is received into the front housing 20.

The blade guards 56, 58 are biased into a closed position covering substantially all of the circumferential edge of blade 40 that extends from within the front housing 20. The blade guards 56, 58 are biased by springs 66, 68 that abut the blade guards 56, 58 and spring abutment members 70 within the front housing, as shown in FIG. 3. In another embodiment, a single spring is positioned to independently bias each blade guard 56, 58.

The blade guards 56, 58 each have a receding edge 57, 59 that results in a notch when the blade guards 56, 58 are in the closed position. This notch causes the blade guards 56, 58 to part when the notch is directly pushed against the object to be cut. As the blade guards 56, 58 part they are rotated about the locking bolt 54.

This means of initiating the cutting function is accomplished with a symmetry that equips and enables both left and right handers equally, when confronted with a frontally positioned object for cutting. The user, with the device 10, in either hand has the same view of the blade 40, unlike asymmetrical cutting devices that typically present a different blade view and/or different hand function requirements for operation of the device, depending on whether the device is being held in the left or right hand.

This advantageous symmetry is a result of the ability of the device 10 to have each blade guard 56, 58 retract independently or simultaneously, with simultaneous retraction being about an axis of symmetry that is coincident with the longitudinal axis of the device 10.

Figure 8:
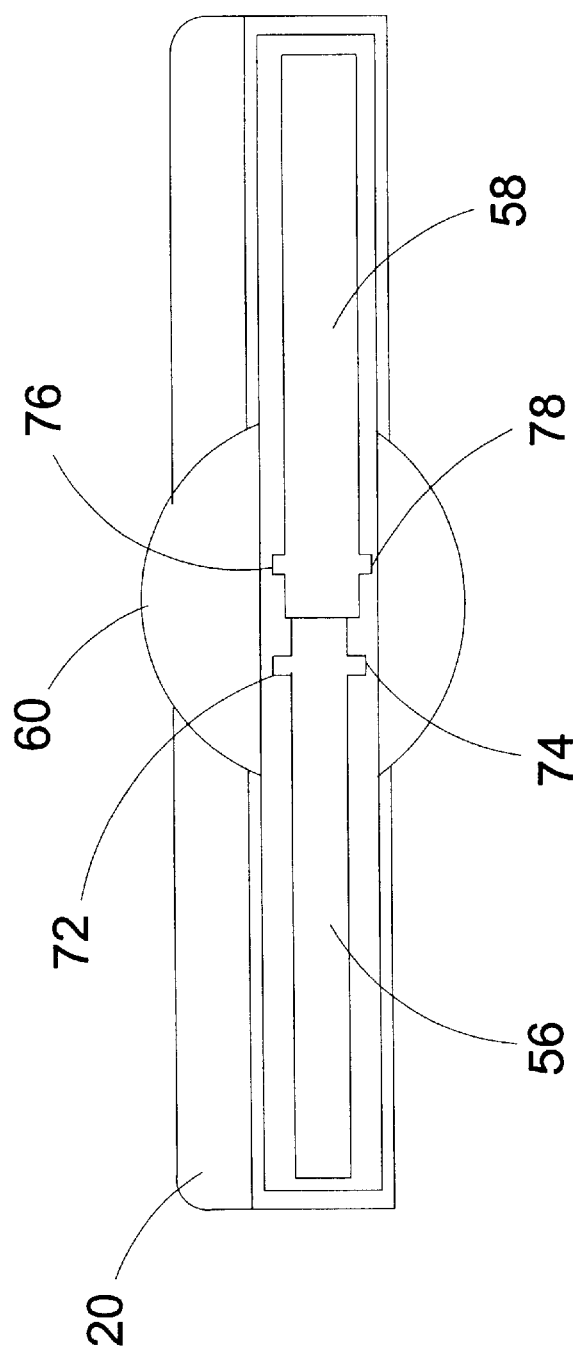
FIG. 8 is a frontal view with the pivot members shown on the blade guards.

FIG. 8 depicts the blade guard pivot members 72, 74, 76, 78 that are provided for pulling either or both of the blade guards 56, 58 into a pivot motion about the locking bolt 54. The first blade guard 56 has a first pivot member 72 and a second pivot member 74, while the second blade guard 58 has a first pivot member 76 and a second pivot member 78. Depending on the orientation of the device 10, the first blade guard 56 can be pulled back as desired using either pivot member 72 or 74, without reaching around to the far side. Similarly, the second blade guard 58 can be pulled back as desired using either pivot member 76 or 78.

The double pivot member combinations on the top and bottom sides of the blade guards 56, 58 enable full symmetry of function when either the thumb or the finger is used to operate the switch 26. For example, the right handed user, with his thumb on the switch 26, and the blade oriented horizontally, can expose a rightward blade 40 sector by pulling back pivot member 72, and can expose a leftward blade 40 sector by pulling back on pivot member 76. Conversely, when the right handed user has his index finger on the switch 26 (that is, "upside down"), he can expose a rightward blade 40 sector by pulling back pivot member 78, and can expose a leftward blade 40 sector by pulling back on pivot member 74.

These combinations on the top and bottom also allow the device 10 to be operated more easily when held above the head, in that the user can easily access the bottom side pivot members 74, 78 even though pivot members 72, 76 would be on the top side and very difficult to grasp.

The symmetrical functions of the two blade guards 56, 58 also provide full reciprocity for a left hander in cases where the blade 40 is turned to a vertical orientation. The right-handed user will accomplish this by rotating his wrist counter-clockwise, while the left-handed user will rotate his wrist clockwise. To obtain a downwardly exposed blade 40 sector, the right handed user pulls back on pivot member 74, while the left handed user, achieves the same functionality by pulling back on pivot member 72. Such left and right-handed parity is also available for situations where an upwardly exposed blade 40 sector is desired. In such a case the right handed user uses pivot member 72 and the left-handed user uses pivot member 74.

Figure 9:
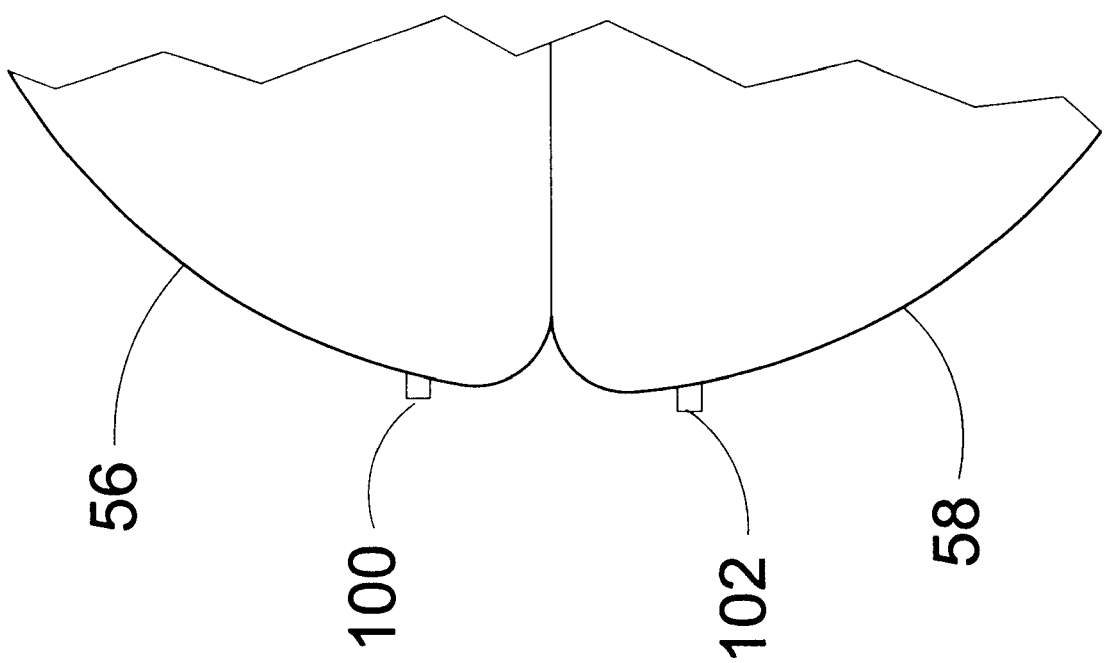
FIG. 9 is a partial top view of an another embodiment showing the pivot members on the edges of the blade guards.

In another embodiment, the first blade guard 56 has a pivot member 100 on the edge of the first blade guard 56, and the second blade guard 58 has a pivot member 102 on its edge, as shown in FIG. 9. In other embodiments, these pivot members 100, 102 are combined with pivot members in positions similar to those of pivot members 72, 74, 76, 78. In one embodiment, the pivot member is a continuous protrusion encompassing both side and edge positions. In other embodiments the pivot members, in combinations such as the foregoing, are recesses in the blade guards 56, 58, sized for fingertip manipulation.

Figure 10:
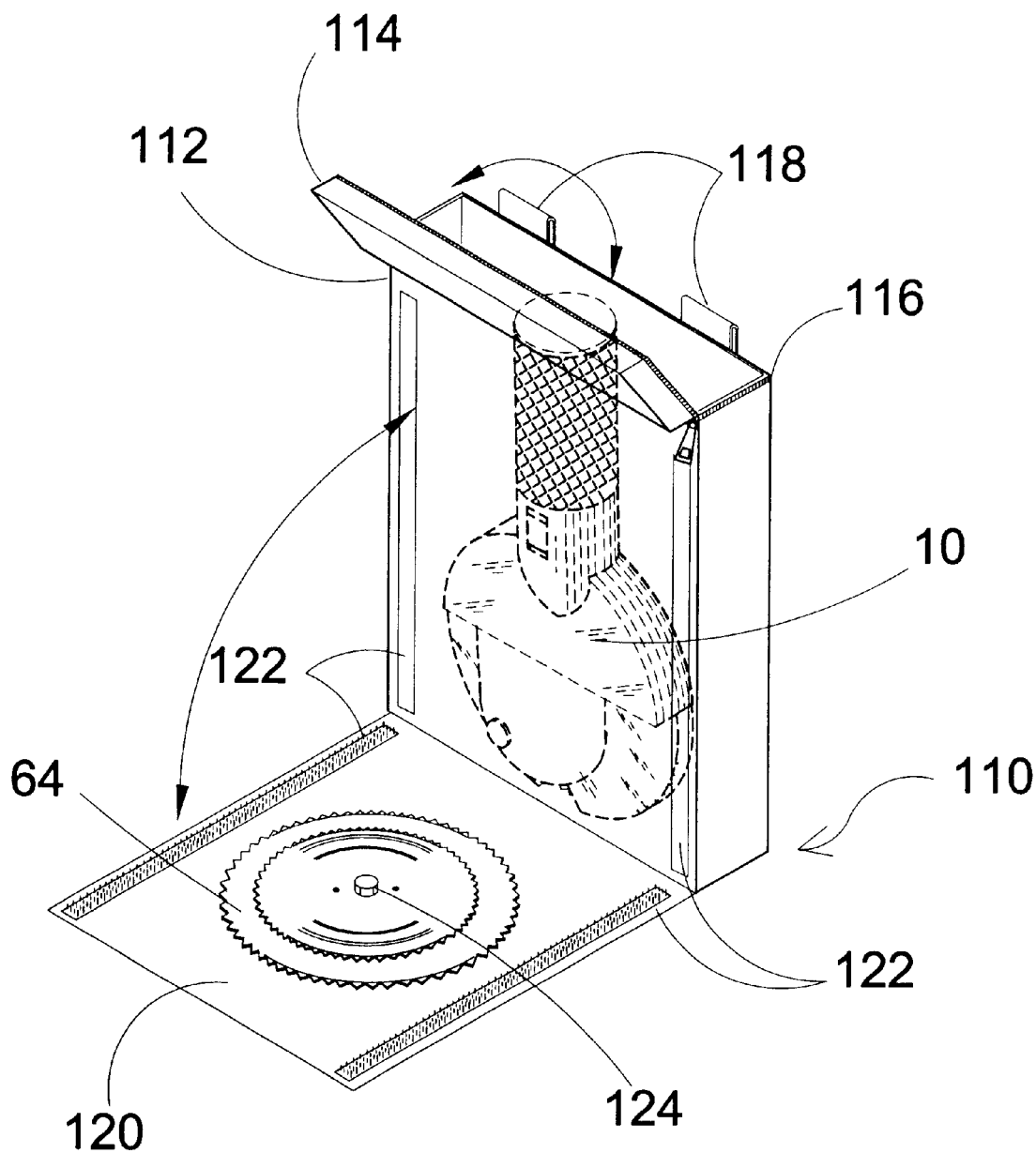
FIG. 10 is a perspective view of the storage and carrying case for the present invention comprising an enclosed case with a zip open lid for easy access to the saw. The case has a hook and loop flip down storage flap to store extra blades.

As shown in FIG. 10 an enclosed carrying case 110 is specially adapted for the device 10, having a compartment 112 with a lid 114 closable using the zipper 116. Belt loops 118 are attached to the compartment 112 for attachment to the user's belt. Extra blades 64 are stored in a flap 120 on the side of the compartment 112. The flap 120 storage can be accessed by separation of the hook and loop fasteners 122 that secure the flap 120 to the compartment 112. The blades 64 are attached to the flap 120 by a small securing nut 124.

Figure 11:
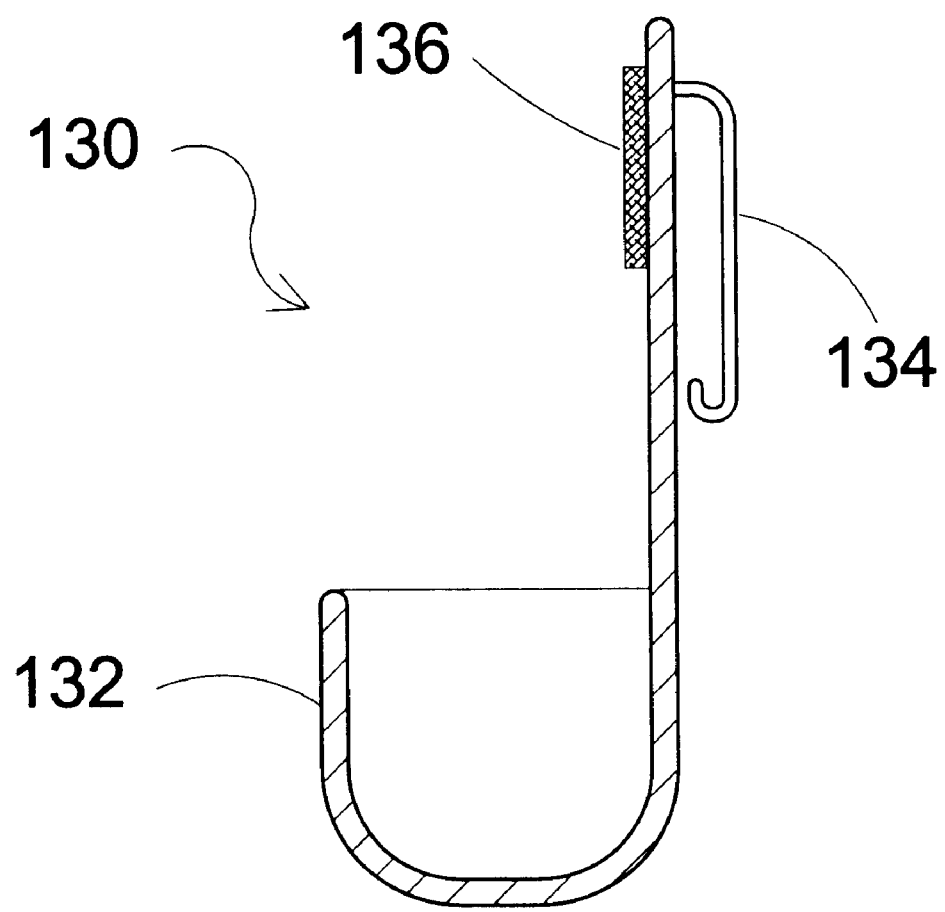
FIG. 11 is a sectional side view of the tool belt attachment clip for the allowing a user to clip the holstered saw to a belt for greater accessibility while working.
Figure 12:
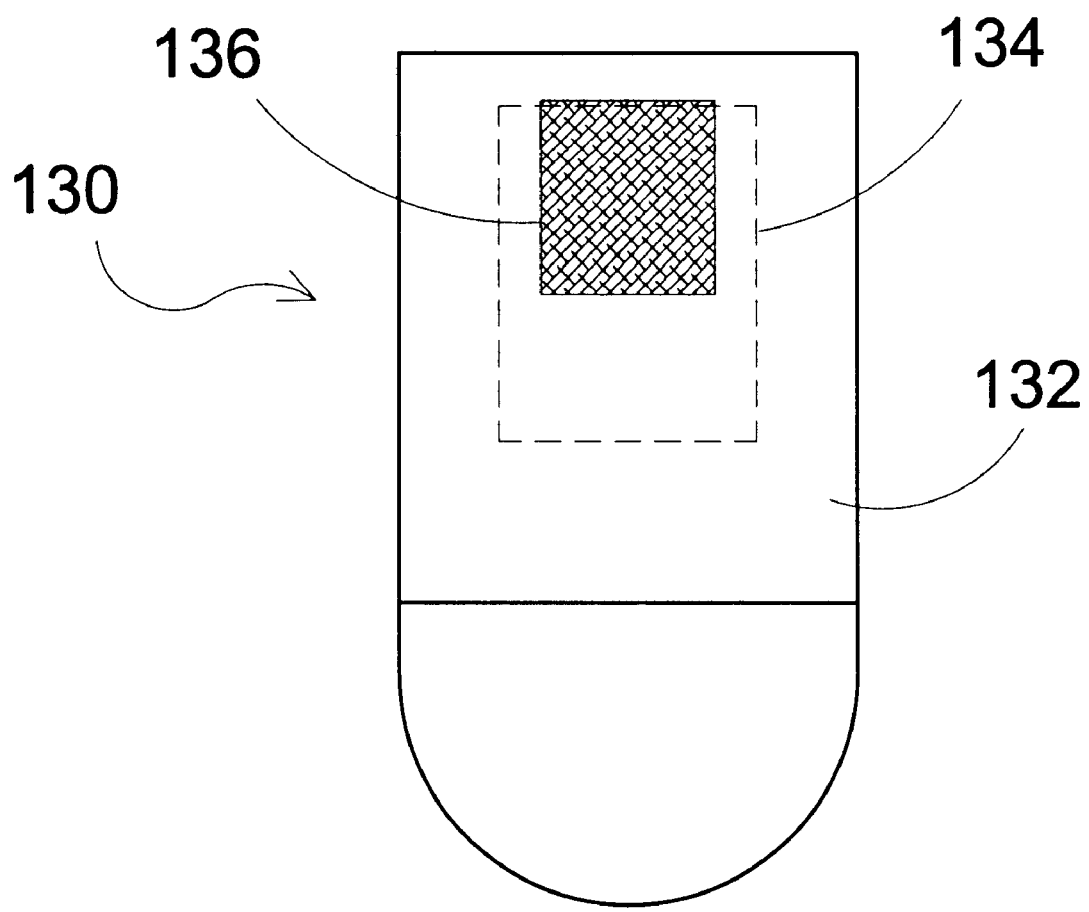
FIG. 12 is a frontal view of the tool belt attachment clip of FIG. 11.

A ready-access belt attachment 130 is also provided, as shown in FIGS. 11–12. The attachment 130 has a holster 132 that is specially adapted to secure and support the device 10. Attached to the holster is a belt clasp 134 for attachment of the holster 132 to the belt. A hook and loop fastener 136 is positioned on the holster 132 to correspond with a device 10 mounted hook and loop fastener portion.

Figure 13:
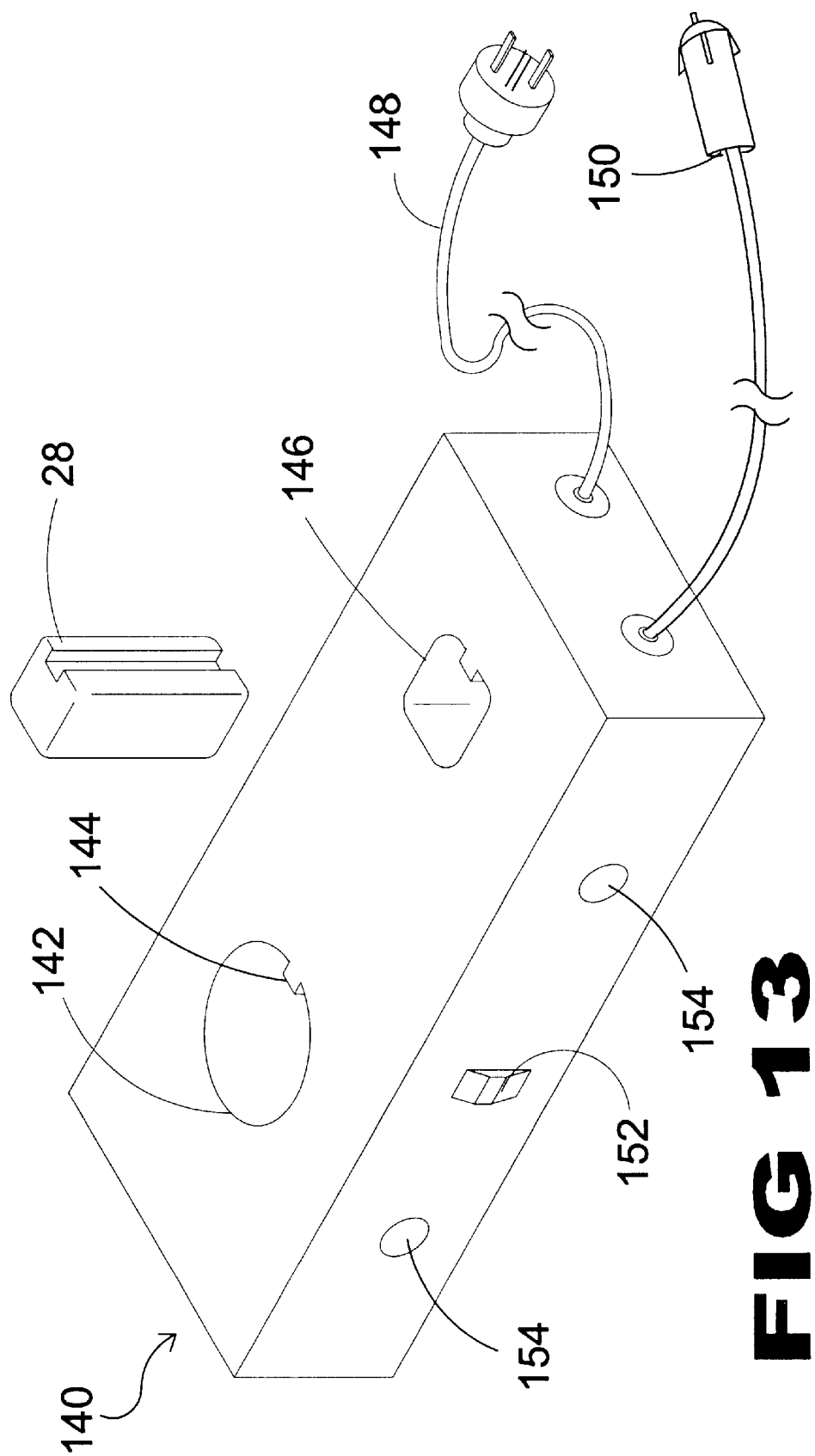
FIG. 13 is a perspective view of the recharging unit of the present invention which allows for recharging the battery by placing it in the battery receptacle or recharging the battery while still in the portable saw by placing the handle into the portable saw receptacle, where terminals from the charger will make contact with the battery by passing through recesses in the end cap.

As shown in FIG. 13, a specially adapted battery charger 140 is provided with a receptacle 142 for receiving the device rear housing 22. The key 144 aligns with the key guide 38 to ensure proper insertion. The user can also remove the battery 30 from the device 10 and insert the battery 30 directly into the charging receptacle 146. The charger 140 has a typical power cord 148 and an automobile charger receptacle cord 150. A function switch 152 is provided to activate the charging and/or refreshing functions, with functional status indicator lights 154 being easily viewable on the side of the charger 140.

In another embodiment, the motor is powered by an externally attachable battery.

The representatively shown switch 26 requires both a downward and a subsequent forward motion of button 25, resisted by leaf spring 27, to activate the motor 28.

The device 10 and its foregoing components can be constructed using various materials, including various metals and plastics for the device 10 and the charger 140, and various materials, including plastics, fabrics, and leather for the case 110 and holster 130. The rotary blade driving connection can be modified for varying types of gear combinations, including double-beveled gears, the inclusion of bearings, etc. The device 10, in various component combinations, can be sized to accommodate applications requiring varying blade sizes and motor power requirements, all in accordance with the present invention, and as determined by the intended end use for the overall device.

With respect to the above description then, it is to be realized that the optimum material and dimensional relationships for the parts of the apparatus 10, to include variations in size, materials, shape, and form, will occur to those skilled in the art upon review of the present disclosure, and all equivalent relationships to those illustrated in the drawings and described in the specification are intended to be encompassed by the present invention.

What is claimed as new and desired to be protected by Letters Patent is set forth in the appended claims:

1. A hand held rotary blade saw powered by a power source, comprising:

a housing, having a front portion and a rear portion;

an electric motor contained within the housing rear portion;

an electro-mechanical switch in electronic communication with the motor and power source for activating motor functions;

a rotary saw blade mounted in the housing front portion, the rotary saw blade having a rear sector circumference enclosed within the housing front portion, a first front sector circumference, and a second front sector circumference, the combined rear, first front and second front circumferences summing to a circle;

a driving connection between the motor and the rotary saw blade for rotating the rotary saw blade;

a first blade guard, the first blade guard being pivotable about the rotary blade from a first position covering substantially all of the blade first front sector circumference, to a second position, such that the first front sector circumference is partially exposed;

a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;

at least one guard spring contained in the housing front portion, the at least one guard spring biasing the first blade guard into the first position, and the second blade guard into the first position; and the first blade guard further comprises at least one pivot member for manual manipulation such that the first blade guard is pivoted about the rotary blade.

2. The saw of claim 1, wherein the first blade guard has a first and second side each side having at least one of the at least one pivot members.

3. The saw of claim 1, wherein at least one of the at least one pivot members protrudes from the first blade guard.

4. The saw of claim 1, wherein at least one of the at least one pivot members recedes into the first blade guard.

5. The saw of claim 1, wherein the first blade guard has an edge proximate the blade circumference and at least one of the at least one pivot members is positioned on the edge.

6. The saw of claim 1, wherein the first blade guard has a first side, a second side, and an edge proximate the blade circumference, and at least one of the at least one pivot members extends continuously from the first side, around the edge and to the second side.

7. A hand held rotary blade saw powered by a power source, comprising:

a housing, having a front portion and a rear portion;

an electric motor contained within the housing rear portion;

an electro-mechanical switch in electronic communication with the motor and power source for activating motor functions;

a rotary saw blade mounted in the housing front portion, the rotary saw blade having a rear sector circumference enclosed within the housing front portion, a first front sector circumference, and a second front sector circumference, the combined rear, first front and second front circumferences summing to a circle;

a driving connection between the motor and the rotary saw blade for rotating the rotary saw blade;

a first blade guard, the first blade guard being pivotable about the rotary blade from a first position covering substantially all of the blade first front sector circumference, to a second position, such that the first front sector circumference is partially exposed;

a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;

at least one guard spring contained in the housing front portion, the at least one guard spring biasing the first blade guard into the first position, and the second blade guard into the first position; and the second blade guard further comprises at least one pivot member for manual manipulation such that the second blade guard is pivoted about the rotary blade.

8. The saw of claim 7, wherein the second blade guard has a first and second side each side having at least one of the at least one pivot members.

9. The saw of claim 7, wherein at least one of the at least one pivot members protrudes from the second blade guard.

10. The saw of claim 7, wherein at least one of at least one pivot members recedes into the second blade guard.

11. The saw of claim 7, wherein the second blade guard has an edge proximate the blade circumference and at least one of the at least one pivot members is positioned on the edge.

12. The saw of claim 7, wherein the second blade guard has a first side, a second side, and an edge proximate the blade circumference, and at least one of the at least one pivot members extends continuously from the first side, around the edge and to the second side.

13. A hand held rotary blade saw powered by a power source, comprising:

a housing, having a front portion and a rear portion;

an electric motor contained within the housing rear portion;

an electro-mechanical switch in electronic communication with the motor and power source for activating motor functions;

a rotary saw blade mounted in the housing front portion, the rotary saw blade having a rear sector circumference enclosed within the housing front portion, a first front sector circumference, and a second front sector circumference, the combined rear, first front and second front circumferences summing to a circle;

a driving connection between the motor and the rotary saw blade for rotating the rotary saw blade;

a first blade guard, the first blade guard being pivotable about the rotary blade from a first position covering substantially all of the blade first front sector circumference, to a second position, such that the first front sector circumference is partially exposed;

a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;

at least one guard spring contained in the housing front portion, the at least one guard spring biasing the first blade guard into the first position, and the second blade guard into the first position; and the first blade guard further comprises at least one pivot member for manual manipulation such that the first blade guard is pivoted about the rotary blade, and the second blade guard further comprises at least one pivot member for manual manipulation such that the second blade guard is pivoted about the rotary blade.

14. The saw of claim 13, wherein the first blade guard has a first and second side each side having at least one of the at least one first blade guard pivot members, and the second blade guard has a first and second side each side having at least one of the at least one second blade guard pivot members.

15. The saw of claim 13, wherein at least one of the at least one first blade guard pivot members protrudes from the first blade guard, and at least one of the at least one second blade guard pivot members protrudes from the second blade guard.

16. The saw of claim 13, wherein at least one of the at least one first blade guard pivot members recedes into the first blade guard, and at least one of the at least one second blade guard pivot members recedes into the second blade guard.

17. The saw of claim 13, wherein the first blade guard has an edge proximate the blade circumference and at least one of the at least one first blade guard pivot members is positioned on the first blade guard edge, and the second blade guard has an edge proximate the blade circumference and at least one of the at least one second blade guard pivot members is positioned on the second blade guard edge.

18. The saw of claim 13, wherein the first blade guard has a first side, a second side, and an edge proximate the blade circumference, and at least one of the at least one first blade guard pivot members extends continuously from the first blade guard first side, around the edge and to the second side, and the second blade guard has a first side, a second side, and an edge proximate the blade circumference, and at least one of the at least one second blade guard pivot members extends continuously from the second blade guard first side, around the edge and to the second side.

19. The saw of claim 1, wherein the power source is a battery.

20. The saw of claim 19, wherein the battery is contained in the housing rear portion, the battery being in electronic communication with the motor.

21. The saw of claim 1, wherein the housing rear portion is adapted to receive a power cord for delivering power to the motor.

22. A hand held rotary blade saw powered by a power source, comprising:

a housing, having a front portion and a rear portion;

an electric motor contained within the housing rear portion;

an electro-mechanical switch in electronic communication with the motor and power source for activating motor functions;

a rotary saw blade mounted in the housing front portion, the rotary saw blade having a rear sector circumference enclosed within the housing front portion, a first front sector circumference, and a second front sector circumference, the combined rear, first front and second front circumferences summing to a circle;

a driving connection between the motor and the rotary saw blade for rotating the rotary saw blade;

a first blade guard, the first blade guard being pivotable about the rotary blade from a first position covering substantially all of the blade first front sector circumference, to a second position, such that the first front sector circumference is partially exposed;

a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;

at least one guard spring contained in the housing front portion, the at least one guard spring biasing the first blade guard into the first position, and the second blade guard into the first position; and the at least one blade guard spring comprises a first blade guard spring biasing the first blade guard and a second blade guard spring biasing the second blade guard.

23. A hand held rotary blade saw powered by a power source, comprising:

a housing, having a front portion and a rear portion;

an electric motor contained within the housing rear portion;

an electro-mechanical switch in electronic communication with the motor and power source for activating motor functions;

a rotary saw blade mounted in the housing front portion, the rotary saw blade having a rear sector circumference enclosed within the housing front portion, a first front sector circumference, and a second front sector circumference, the combined rear, first front and second front circumferences summing to a circle;

a driving connection between the motor and the rotary saw blade for rotating the rotary saw blade;

a first blade guard, the first blade guard being pivotable about the rotary blade from a first position covering substantially all of the blade first front sector circumference, to a second position, such that the first front sector circumference is partially exposed;

a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;

at least one guard spring contained in the housing front portion, the at least one guard spring biasing the first blade guard into the first position, and the second blade guard into the first position; and the driving connection further comprises a post positioned within the housing front portion, a blade gear, the blade gear being attached to the rotary blade and mounted on the post for rotation, and a rotor shaft extending out of the motor and into the housing front portion, the rotor shaft being in geared communication with the blade gear such that the gear is rotated as the rotor shaft is rotated.

24. A hand held rotary blade saw powered by a power source, comprising:
- a housing, having a front portion and a rear portion;
- an electric motor contained within the housing rear portion;
- an electro-mechanical switch in electronic communication with the motor and power source for activating motor functions;
- a rotary saw blade mounted in the housing front portion, the rotary saw blade having a rear sector circumference enclosed within the housing front portion, a first front sector circumference, and a second front sector circumference, the combined rear, first front and second front circumferences summing to a circle;
- a driving connection between the motor and the rotary saw blade for rotating the rotary saw blade;
- a first blade guard, the first blade guard being pivotable about the rotary blade from a first position covering substantially all of the blade first front sector circumference, to a second position, such that the first front sector circumference is partially exposed;
- a second blade guard, the second blade guard being pivotable about the rotary blade from a first position covering substantially all of the blade second front sector circumference to a second position, such that the second front sector circumference is partially exposed, the first blade guard being adapted to receive the second blade guard when either or both the first or second blade guards are pivoted, the housing front portion being adapted to receive the first blade guard when the first blade guard is pivoted, and to receive the second blade guard when the second blade guard is pivoted;
- at least one guard spring contained in the housing front portion, the at least one guard spring biasing the first blade guard into the first position, and the second blade guard into the first position; and
- the first and second blade guards each have a forward edge, the forward edges being substantially aligned and proximate when the first and second blade guards are both in the first position, the first and second blade guard forward edges each having a receding edge such that the forward edge receding edges form a notch.

25. The saw of claim 23, wherein the blade gear has at least two locking posts, the rotary blade having at least two apertures for closely receiving the locking posts, thus preventing slip as the rotary blade rotates with the blade gear on the post.

26. The saw of claim 23, wherein the housing front portion has a removable portion, allowing removal of the blade from the post.

27. The saw of claim 23, which further comprises a hub assembly having a first and second portion, the blade and the blade gear each having a centrally disposed hole for closely receiving the hub assembly first portion, the blade being attached to the blade gear by the joinder of the hub assembly second portion to the first portion so received.

28. The saw of claim 27, wherein the blade gear has at least one protrusion and the blade has at least one hole aligned with said protrusion when the blade is attached to the blade gear.

29. The saw of claim 1, wherein the switch has a member positioned for being pressed by a thumb while the housing rear portion is being hand held.

30. The saw of claim 29, wherein the member must be pressed down and then forward to activate the motor.

31. The saw of claim 1, which further comprises a carrying case, the case being sized to receive the saw, the case having a zippered lid, at least one belt loop, a hinged flap, the flap having a threaded protrusion for receiving additional blades, and a nut for coupling with the threaded protrusion on the flap.

32. The saw of claim 1, which further comprises a saw carrying device for carrying the saw on a belt, the device having a holster, a belt clasp for art aching the holster to the belt, and a hook and loop fastener having a first portion on the holster and a second portion on the saw.

33. A hand held rotary blade saw, comprising:
- a housing, having a front portion and a rear portion;
- a rotary saw blade mounted in the housing rear portion on a post, the rotary saw blade having a rear sector circumference enclosed within the housing front portion, a first front sector circumference, and
- a second front sector circumference, the combined rear, first front and second front circumferences summing to a circle;
- means for electro-mechanically rotating the rotary saw blade;
- means for alternately covering and partially exposing the blade first front sector circumference, said means being biased to the covering position;
- means for alternately covering and partially exposing the blade second front sector circumference, said means being biased to the covering position; and
- the means for alternately covering and partially exposing the blade first front sector further comprises means for manually manipulating said means from both above and below the bottom side of the saw.

34. The saw of claim 33, wherein the means for alternately covering and partially exposing the blade second front sector further comprises means for manually manipulating said means from both above and below the bottom side of the saw.

35. The saw of claim 34, wherein the means for electro-mechanically rotating the rotary saw blade has a motor, a power source for powering the motor, an electro-mechanical switch for activating the motor functions, a rotor shaft rotated by the motor, a drive gear rotated by the rotor shaft, and a blade gear rotated by the drive gear and attached to the rotary blade.

36. The saw of claim 35, wherein the power source is a battery.

37. The saw of claim 36, which further comprises means for charging the battery.

38. The saw of claim 37, wherein the means for charging battery further comprises means for charging the battery while the battery remains in the housing rear portion.

39. The saw of claim 33, which further comprises means for enclosing and transporting the saw.

40. The saw of claim 33 which further comprises means for holstering and transporting the saw.

* * * * *